Feb. 14, 1967   H. BUERGER   3,304,125
WHEEL TRIMS FOR VEHICLE WHEELS WITH TIRES
Filed May 11, 1965

INVENTOR.
HERBERT BUERGER
BY
J.B. Felshin
ATTORNEY.

United States Patent Office 3,304,125
Patented Feb. 14, 1967

3,304,125
WHEEL TRIMS FOR VEHICLE WHEELS
WITH TIRES
Herbert Buerger, Walton, N.Y., assignor to Del Krome
Corp., Walton, N.Y., a corporation of New York
Filed May 11, 1965, Ser. No. 454,834
7 Claims. (Cl. 301—37)

This invention relates to wheel trims for vehicle wheels with tires.

It is an object of the invention to provide metal and rubber wheel trims of the universal type (separate from the wheel hub caps) which simulate or give the impression of whitewall tires when applied to wheels carrying blackwall tires.

Another object of this invention is to provide improved wheel trims of the character described which may be used without the rubber ring.

Still another object of this invention is to provide improved wheel trims of the character described comprising improved wheel grasping means which are not readily seen from the front.

A further object of this invention is to provide improved wheel trims of the character described wherein the grasping means are struck from a wall of the wheel trim.

Still another object of this invention is to provide strong, rugged and durable wheel trims of the character described, which shall be attractive in appearance, relatively inexpensive to manufacture, relatively easy to apply to a wheel, and which shall be practical yet be practical and efficient to a high degree in use.

Other objects of this invention will in part be obvious and in part hereinafter pointed out.

The invention accordingly consists in the features of construction, combinations of elements, and arrangement of parts which will be exemplified in the construction hereinafter described, and of which the scope of invention will be indicated in the following claims.

Figure 1:
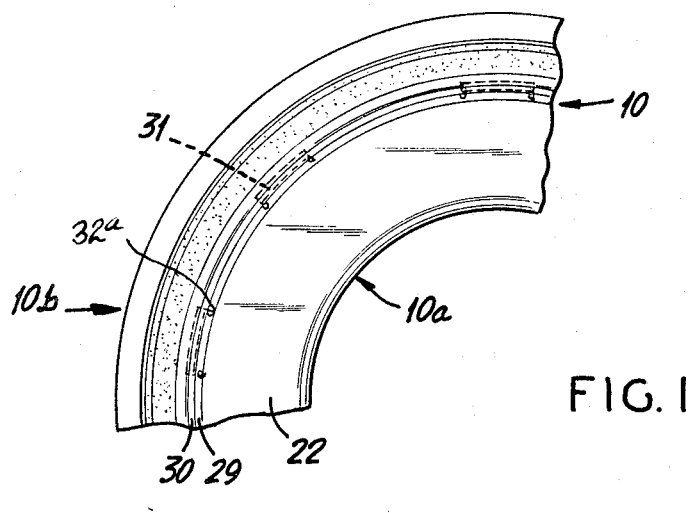
Figure 2:
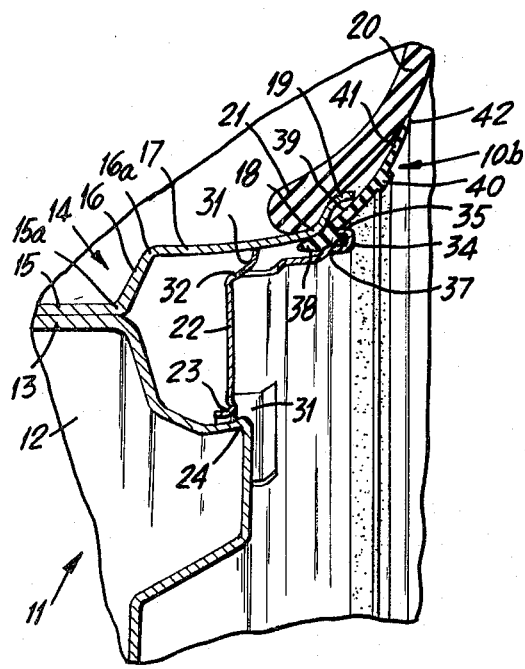
Figure 3:
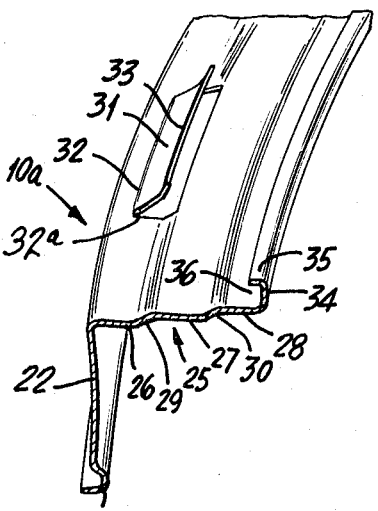

In the accompanying drawing, in which is shown an illustrative embodiment of this invention, FIG. 1 is a partial front elevational view of a wheel trim embodying the invention;

FIG. 2 is a partial, cross-sectional, view of the trim of FIG. 1 shown mounted on a wheel; and FIG. 3 is a cross-sectional and perspective view of a part of the trim of FIG. 1.

Referring to the drawing in detail, 10 designates a trim embodying the invention, mounted on a conventional automobile wheel 11.

Wheel 11 comprises a wheel center portion 12 having an outer rim portion 13. Fixed to outer rim portion 13 is a tire rim 14. Rim 14 comprises an axially and radially innermost axial flange 15 which is fixed to rim portion 13. Extending from the outer end of flange 15 is an axially and radially outwardly inclined flange 16. Flanges 15 and 16 are joined by a concave outwardly curved portion 15a. A concave inwardly curved portion 16a joins flange 16 to an axially extending intermediate flange 17. The axial outer end of flange 17 is curved concave outwardly as at 18. An end flange 19 extends from the end of portion 18 and is curved concave inwardly. A tire 20 is mounted on the rim 14 of wheel 11, and comprises a bead portion 21 received on the radially outer side of parts 17, 18 and 19 of the rim.

Wheel trim 10 comprises a metal trim ring 10a which comprises a bottom, radially disposed, annular, substantially flat flange portion 22. The radially inner end of flange 22 comprises a bent back bead portion 23, which is in spaced relation to the usual hub cap retaining lip 24 on the wheel center portion 12. Extending substantially axially outwardly from the radially outer end of flange 23 is a substantially axially disposed, stepped, cylindrical flange 25. All of flange 25 is of smaller diameter than intermediate run flange 17. Flange 25 comprises three stepped cylindrical flanges or portions 26, 27 and 28 which progressively increase in diameter in the axially outward direction. Each flange portion 26, 27 and 28 is substantially axially disposed. Flange portions 26 and 27, and flange portions 27 and 28, are joined by short, radially and axially outwardly inclined flange portions 29 and 30, respectively. Formed in and struck radially outwardly from flange portions 26 and 29 are a series of spaced trim retaining fingers 31. Fingers 31 of each of substantially rectangular shape, are joined to flange portion 26 as at 32 adjacent the juncture of flanges 22 and 25, and are inclined radially and axially outwardly from flange 25. The ends of the bends 32 joining each finger to the flange are provided with small rounded cut-outs 32a. The outer ends 33 of fingers 31 are normally disposed in a cylindrical plane having a radius somewhat larger than the radius of intermediate rim flange 17, in order to be depressed by and to frictionally grip intermediate flange 17 when the trim is applied to the wheel, as is shown in FIG. 2.

Extending radially outwardly from the outer end of flange portion 28 is a radially disposed annular, flat flange 34. Flange 34 is substantially in the plane of the end of flange 19 of the tire rim. Extending axially inwardly of the radially outer end of flange 34 is a cylindrical flange 35, which is disposed substantially parallel to flange 28. Thus, flanges 28, 34 and 35 form an axially inwardly opening channel 36.

Trim ring 10a may be made of any suitable metal such as steel, stainless steel, aluminum, or the like, and all exposed surfaces thereof may be treated such as by polishing, chromium plating or the like to present an attractive appearance. Ring 10a may be used alone, or may be used together with rubber trim ring 10b, as follows. When the ring 10a is used alone, the outer flange 34, together with the flanges 28 and 35, presents a striking three-dimensional appearance.

Ring 10a, called the rubber ring, serves to give the tire on the wheel the appearance of a white wall tire and may be made of butyl rubber, or any rubber-like, flexible, resilient, non-metallic material. Ring 10b comprises an axially outwardly extending bead 37 which is received in and gripped and secured by the flanges 28, 34 and 35 forming channel 36. Extending axially inwardly from bead 37 is a portion 38 which extends and is resiliently clamped between flange portions 28 and 30 of cylindrical flange 25, and curved portion 18 of the tire rim. Extending radially and axially outwardly from bead 37 and portion 38 is a portion 39 which passes between flange 35 and flange 19 of the tire rim. Portion 39 may terminate in a bead 40. Bead 40 and portion 39 may be black and suitably treated to simulate a black tire side wall. Extending from bead 40 is a portion 41 which may be white to simulate a white side wall tire, and which terminates in a feathered edge 42 so as to make its contact with tire 20 as inconspicuous as possible. Portions 39 and 41, in the position of FIG. 2, are bent to the right of their normal position with respect to bead 37 and portion 38, whereby the resiliency of the material urges portions 39 and 41 against the tire.

It will thus be seen that there is provided an apparatus and article in which the several objects of this invention are achieved, and which is well adapted to meet the conditions of practical use.

As possible embodiments might be made of the above invention, and as various changes might be made in the embodiment above set forth, it is to be understood that all matter herein set forth and shown in the accompanying drawings, is to be interpreted as illustrative and not in a limiting sense.

I claim:
1. A member adapted to be attached to the tire rim of a wheel comprising an annular wall extending substantially axially outwardly, a plurality of gripping fingers extending radially and axially outwardly of said axially extending wall, said fingers having outer edge portions, and fingers being cut from said axially extending wall to form openings in said wall and said fingers overlying said openings, means forming an axially inwardly opening channel, which channel is located at the axially outer end of said axially extending annular wall, and is disposed radially outwardly of and surrounds said axially extending wall, and said channel forming means having an axially inwardly extending end edge, and a white wall tire simulating ring of rubber-like material having an annular bead portion gripped and secured within said channel by said channel forming means, and an annular portion extending axially inwardly from the gripped portion of said ring and overlying said axially extending wall, and an annular portion extending radially and axially outwardly from between said gripped portion and overlying portion, and forming with said gripped portion, an annular outwardly opening wedge shaped groove, and said annular end edge of said channel forming means projecting into said wedge shaped annular groove, said channel forming means comprising an axially outer annular wall extending radially outwardly from the axially outer end of said axially extending wall, a cylindrical wall extending axially inwardly from said radially extending wall and said annular end edge being formed on the axially inner end of said cylindrical wall.

2. The combination of claim 1, said axially extending wall comprising a plurality of axially and radially outwardly extending steps, and said axially inwardly extending overlying portion of said ring being spaced radially outwardly of a step of said axially extending annular wall.

3. The combination of claim 1, an annular wall extending radially inwardly from the axially inner end of said axially extending wall, and disposed in substantially a vertical plane.

4. The combination of claim 3, and a bent back annular peripheral bead formed at the radially inner end of said radially extending annular wall.

5. The combination of claim 4, said fingers each being formed of stepped portions of said axially extending wall.

6. The combination of claim 1, each of said fingers having a substantially rectangular outer shape and having outer edge portions lying in a common circle concentric with the axis of said member.

7. The combination of claim 3, said fingers being located adjacent said radially extending wall.

References Cited by the Examiner
UNITED STATES PATENTS

| | | | |
|---|---|---|---|
| 2,757,972 | 8/1956 | Lyon | 301—37 |
| 3,001,827 | 9/1961 | Lyon | 301—37 |
| 3,050,339 | 8/1962 | Lyon | 301—37 |
| 3,055,712 | 9/1962 | Shoemaker | 301—37 |
| 3,055,713 | 9/1962 | Lyon | 301—37 |
| 3,174,803 | 3/1965 | Mulhern | 301—37 |
| 3,183,038 | 5/1965 | Aske | 301—37 |
| 3,188,143 | 6/1965 | Kraines | 301—37 |
| 3,220,775 | 11/1965 | Aske | 301—37 |

BENJAMIN HERSH, *Primary Examiner.*

R. J. JOHNSON, *Assistant Examiner.*